(12) United States Patent
Choi et al.

(10) Patent No.: US 12,538,247 B2
(45) Date of Patent: Jan. 27, 2026

(54) COMMUNICATION REPEATER AND METHOD FOR RESTORING SYNCHRONIZATION THEREOF

(71) Applicant: SOLiD, INC., Seongnam-si (KR)

(72) Inventors: Hyekjae Choi, Incheon (KR); Inho Jang, Gyeonggi-do (KR)

(73) Assignee: SOLiD, INC., Seongnam-si (KR)

( * ) Notice: Subject to any disclaimer, the term of this patent is extended or adjusted under 35 U.S.C. 154(b) by 250 days.

(21) Appl. No.: 18/145,409

(22) Filed: Dec. 22, 2022

(65) Prior Publication Data

US 2023/0199682 A1 Jun. 22, 2023

(30) Foreign Application Priority Data

Dec. 22, 2021 (KR) .......... 10-2021-0184543
Mar. 23, 2022 (KR) .......... 10-2022-0035880

(51) Int. Cl.
*H04W 56/00* (2009.01)
*H04W 16/26* (2009.01)

(52) U.S. Cl.
CPC ....... *H04W 56/0015* (2013.01); *H04W 16/26* (2013.01); *H04W 56/004* (2013.01)

(58) Field of Classification Search
CPC ............. H04W 56/0015; H04W 16/26; H04W 56/004; H04W 56/001
See application file for complete search history.

(56) References Cited

U.S. PATENT DOCUMENTS

| 11,457,422 B2 * | 9/2022 | Jain ............... H04W 56/001 |
| 2004/0057543 A1 | 3/2004 | Huijgen et al. |
| 2018/0310226 A1 | 10/2018 | Kim et al. |
| 2018/0375573 A1 | 12/2018 | Kim |
| 2020/0022068 A1 * | 1/2020 | Ly ............... H04J 11/0073 |
| 2022/0361128 A1 * | 11/2022 | Singh ............ H04L 5/0051 |

FOREIGN PATENT DOCUMENTS

| EP | 2 745 562 B1 | 11/2017 |
| KR | 10-2019-0038255 A | 4/2019 |
| KR | 10-2020-0016311 A | 2/2020 |

OTHER PUBLICATIONS

Extended European Search Report dated Apr. 28, 2023 in European Application No. 22215750.5.

* cited by examiner

*Primary Examiner* — Marcus Smith
*Assistant Examiner* — Rowan K Fakhro
(74) *Attorney, Agent, or Firm* — Sughrue Mion, PLLC

(57) ABSTRACT

Provided is a communication repeater including a receiver configured to receive a plurality of test signals from a plurality of external communication devices and then receive a plurality of downlink signals from the plurality of external communication devices, and a digital signal processor configured to measure a delay time of each of the plurality of test signals and perform a delay synchronization process for the plurality of downlink signals, wherein the digital signal processor is configured to determine whether the plurality of downlink signals for which the delay synchronization process has been performed are synchronized, and perform synchronization restoration for a downlink signal having a synchronization error among the plurality of downlink signals, based on a result of the determining.

10 Claims, 10 Drawing Sheets

110

COMMUNICATION REPEATER AND METHOD FOR RESTORING SYNCHRONIZATION THEREOF

CROSS-REFERENCE TO RELATED APPLICATION

This application claims the benefit of Korean Patent Applications No. 10-2021-0184543, filed on Dec. 22, 2021, and No. 10-2022-0035880, filed on Mar. 23, 2022, in the Korean Intellectual Property Office, the disclosures of which are incorporated herein in their entireties by reference.

BACKGROUND

1. Field

The disclosure relates to a communication repeater and method for restoring synchronization in the repeater.

2. Description of the Related Art

A distributed antenna system (DAS) is a technology used to solve high traffic capacity problems in indoor environments by spatially distributing low-output antennas. There is a radio shadow section formed in covering a wide area with a single antenna, and to solve this problem, low-output antennas are arranged in the area in a distributed fashion.

The DAS includes main units (MUs) and remote units (RUs). The DAS may perform signal synchronization for all the RUs to emit the same signals at the same time. For example, the MU may transmit a random signal to a plurality of RUs, and then use 'receive acknowledgment signals' (e.g., ACK signals) received from the respective RUs to determine delay times for all the RUs to output signals at the same time (i.e., a signal delay time required for each RU to emit a signal after signal reception). After this, the MU may transmit information about the delay time to each RU, which may in turn store the information about the delay time received from the MU and then emit the signal received from the MU by delaying the signal by a time set individually. In this way, the plurality of RUs connected to the MU are able to emit the same signal at the same time.

What are described above corresponds to a case of synchronizing signals in a DAS where an MU is connected to a plurality of RUs. On the contrary to this, there also exists a DAS including a single RU (hereinafter, referred to as a shared RU) connected to a plurality of MUs. In this case where the shared RU is connected to the plurality of MUs, the MUs may be located at different places and operated by different operators. Hence, the MUs connected to the shared RU may not be connected to each other.

When the aforementioned signal synchronization method for a typical RU is applied to the shared RU, not all the plurality of MUs may be synchronized. In a time division duplexing (TDD) based mobile communication network in particular, signal synchronization between different operators is very important, and when the signal synchronization between the operators fails in the shared RU, a signal of a first operator may affect a signal of a second operator, so the communication quality of the second operator may become worse. Hence, the shared RU also needs to simultaneously transmit the respective signals received from the multiple MUs.

In the meantime, when an abnormal situation occurs due to a connection error or device error of one of the plurality of MUs connected to the shared RU, it may cause failures of services of the other MUs as well, so there is a need for a function to prevent the problem.

SUMMARY

The disclosure provides a method of restoring synchronization to resolve a problem that may arise when a time synchronization error in a shared remote unit (RU) connected to a plurality of main units (MUs) caused by an error in a certain MU leads to a failure of services provided by other MUs.

The objective of the disclosure is not limited thereto, and it is obvious to those of ordinary skill in the art that unmentioned other objectives will be clearly appreciated from the following description.

According to an aspect of the disclosure, a communication repeater includes a receiver configured to receive a plurality of test signals from a plurality of external communication devices and then receive a plurality of downlink signals from the plurality of external communication devices, and a digital signal processor configured to measure a delay time of each of the plurality of test signals and perform a delay synchronization process for the plurality of downlink signals, wherein the digital signal processor is configured to determine whether the plurality of downlink signals for which the delay synchronization process has been performed are synchronized, and perform synchronization restoration for a downlink signal having a synchronization error among the plurality of downlink signals, based on a result of the determining.

The digital signal processor may, when there is a downlink signal having the synchronization error, perform synchronization restoration for the downlink signal having the synchronization error based on other downlink signal correctly synchronized.

The digital signal processor may reproduce the other downlink signal correctly synchronized, and replace the downlink signal having the synchronization error with the reproduced downlink signal.

The digital signal processor may obtain a clock for each of the received plurality of test signals, and set one of the obtained plurality of clocks as a reference clock, and process a clock for each of the received plurality of downlink signals to correspond to the reference clock.

The digital signal processor may set one of the obtained plurality of clocks as the reference clock, based on a loss of signal (LoS) of each of the plurality of test signals.

The digital signal processor may perform a delay synchronization process on the plurality of downlink signals based on the longest of the delay times of the plurality of test signals.

According to an aspect of the disclosure, a method of restoring synchronization of a communication repeater includes measuring a delay time of each of a plurality of test signals received from a plurality of external communication devices, performing a delay synchronization process for a plurality of downlink signals received from the plurality of external communication devices based on the measured delay times, determining whether the plurality of downlink signals for which the delay synchronization process has been performed are synchronized, and performing synchronization restoration for a downlink signal determined to have a synchronization error among the plurality of downlink signals.

BRIEF DESCRIPTION OF THE DRAWINGS

The above and other features and advantages of the disclosure will become more apparent by describing in detail exemplary embodiments thereof with reference to the attached drawings in which.

DETAILED DESCRIPTION

Various modifications may be made to embodiments of the disclosure, which will be described more fully hereinafter with reference to the accompanying drawings. The disclosure may be embodied in many different forms and should not be construed as limited to the embodiments of the disclosure set forth herein; rather, these embodiments of the disclosure are provided so that the disclosure will be thorough and complete, and will fully convey the scope of the disclosure to those of ordinary skill in the art.

If it is determined that a detailed description of commonly-used technologies or structures related to the embodiments of the disclosure may unnecessarily obscure the subject matter of the disclosure, the detailed description will be omitted. Ordinal numbers (e.g., first, second, etc.) as herein used are to distinguish components from one another.

When the term "connected" or "coupled" is used, a component may be directly connected or coupled to another component. However, unless otherwise defined, it is also understood that the component may be indirectly connected or coupled to the other component via another new component.

The terms "unit", "device", "~er (~or)", "module", etc., refer to a processing unit of at least one function or operation, which may be implemented by hardware such as a processor, a microprocessor, a micro controller, a central processing unit (CPU), a graphics processing unit (GPU), an accelerate processor unit (APU), a digital signal processor (DSP), an application specific integrated circuit (ASIC), a field programmable gate array (FPGA), etc., software, or a combination of hardware and software.

Throughout the specification, components may be discriminated by their major functions. For example, two or more components as herein used may be combined into one, or a single component may be subdivided into two or more sub-components according to subdivided functions. Each of the components may perform its major function and further perform part or all of a function served by another component. In this way, part of a major function served by each component may be dedicated and performed by another component.

Various embodiments of the disclosure will be described one by one in detail.

Figure 1:
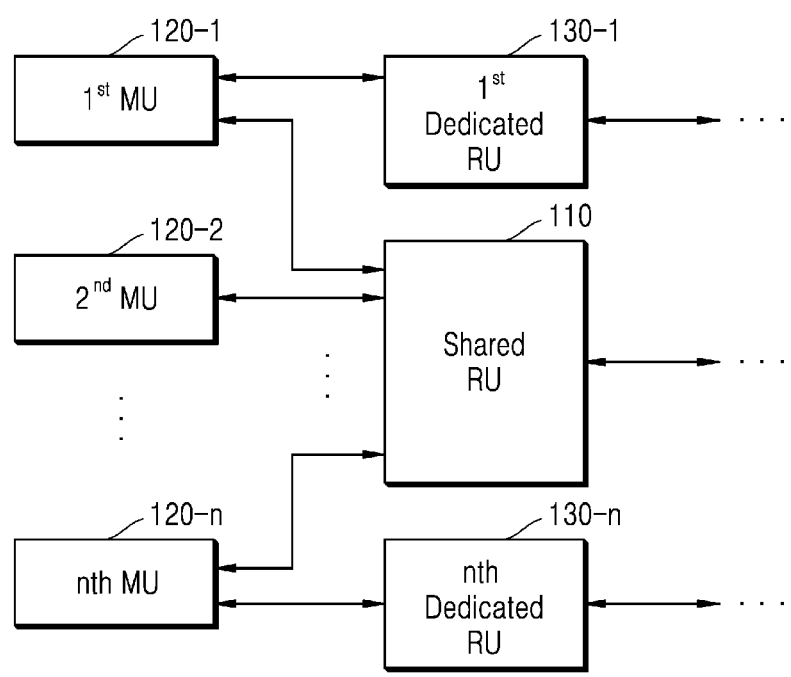
FIG. 1 is a block diagram of a mobile communication system, according to an embodiment of the disclosure.

FIG. 1 is a block diagram of a mobile communication system, according to an embodiment of the disclosure.

Referring to FIG. 1, a mobile communication system 100 may be a distributed antenna system (DAS), including a shared remote unit (RU) 110, n main units (MUs) 120-1 to 120-*n*, and a plurality of dedicated RUs, where n is a natural number equal to or greater than 2.

Each of the n MUs 120-1 to 120-*n* may be connected to a base station (not shown), and may transmit downlink signals received from the base station to one or more RUs connected to the MU. Furthermore, each of the n MUs 120-1 to 120-*n* may transmit uplink signals received from one or more RUs to the base station.

Moreover, each of the MUs 120-1 to 120-*n* may be connected to one or more of the shared RU 110 and the dedicated RUs 130-1 to 130-*n*. For example, the first MU 120-1 may be connected to the shared RU 110 and the first dedicated RU 130-1. In another example, the second MU 120-2 may be connected only to the shared RU 110. In yet another example, the n-th MU 120-*n* may be connected to the shared RU 110 and the n-th dedicated RU 130-*n*.

Although the MUs 120-1 to 120-*n* are each shown in FIG. 1 as being connected to one shared RU 110 or one dedicated RU 130-1 to 130-*n*, another dedicated RU may be connected in series with the shared RU 110 or the dedicated RU 130-1 to 130-*n*. In the following description, for convenience of explanation and understanding of the disclosure, assume that one MU is connected to one shared unit 110 and one of the dedicated RUs 130-1 to 130-*n* in parallel.

Furthermore, a different agent or operator may manage each of the MUs 120-1 to 120-*n*. For example, the first MU 120-1 may be a communication device managed by operator A, the second MU 120-2 may be a communication device managed by operator B, and the n-th MU 120-*n* may be a communication device managed by operator N. Hence, direct communication between the MUs 120-1 to 120-*n* may not be possible.

The shared RU 110 may be an RU included in the mobile communication system 100 and connected to the plurality of MUs 120-1 to 120-*n*. The shared RU 110 may be distinguished from the dedicated RU 130-1 to 130-*n* in that the MUs 120-1 to 120-*n* connected to the shared RU 110 are managed by different operators.

Even though the dedicated RUs 130-1 to 130-*n* are remote devices included in the mobile communication system 100, they may be connected to communication devices managed by the same operator unlike the shared RU 110. For example, the first dedicated RU 130-1 may be connected to the first MU 120-1, and may not be connected to the other MUs 120-2 to 120-*n*.

In the meantime, downlink signals output from the MUs 120-1 to 120-*n* may be synchronized and output by the connected RUs 110, 130-1 to 130-*n*. The shared RU 110 in particular may synchronize in a predetermined method and output the plurality of downlink signals transmitted from different sites, and simultaneously, even synchronize outputs with the dedicated RUs 130-1 to 130-*n* connected to the MUs 120-1 to 120-n. An operation of synchronizing input signals in the shared RU 110 will now be described in detail.

Figure 2:
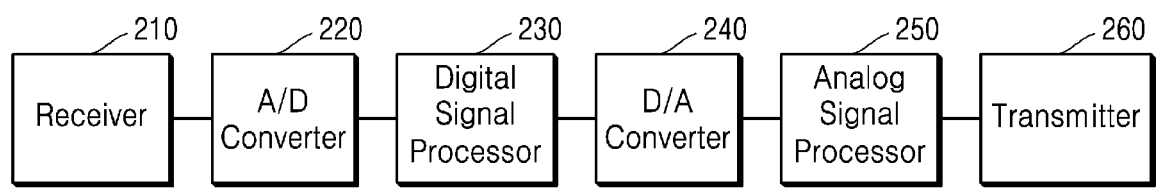
FIG. 2 is a block diagram of a shared remote unit (RU), according to an embodiment of the disclosure.

FIG. 2 is a block diagram of a shared RU, according to an embodiment of the disclosure.

Referring to FIG. 2, the shared RU 110 may include a signal receiver 210, an analog-to-digital (A/D) converter 220, a digital signal processor 230, a digital-to-analog (D/A) converter 240, an analog signal processor 250, and a signal transmitter 260.

Although the signal receiver 210 and the signal transmitter 260 are shown in FIG. 2 as being separated from each other, they may be implemented in a single device, e.g., a transceiver. The signal receiver 210 may be a device connected to the plurality of MUs 120-1 to 120-n for receiving signals from the respective MUs 120-1 to 120-n, the signal transmitter 260 may be a device connected to the plurality of MUs 120-1 to 120-n for transmitting signals to the respective MUs 120-1 to 120-n, and the signal receiver 210 and the signal transmitter 260 may be combined into a transceiver.

Alternatively, as many signal receivers 210 and/or signal transmitters 260 as the number of MUs 120-1 to 120-n may be included in the shared RU 110. For example, when n MUs 120-1 to 120-n are connected to the shared RU 110, there may be n signal receivers 210 and/or n signal transmitters 260 included in the shared RU 110.

A signal received from each of the MUs 120-1 to 120-n may be an optical signal. In this case, the signal receiver 210 and/or the signal transmitter 260 may be implemented as a device capable of receiving and/or transmitting the optical signal.

The signal transmitter 260 may be configured to include an antenna for emitting a radio signal to the outside. In this case, the signal transmitter 260 and the signal receiver 210 may not be implemented as a single transceiver.

When a signal received from each of the MUs 120-1 to 120-n is an analog signal, the A/D converter 220 may convert the received analog signal to a digital signal. On the other hand, when the signal received from each of the MUs 120-1 to 120-n is a digital signal, the A/D converter 220 may not be included in the shared RU 110.

The digital signal processor 230 may be configured to process an input digital signal and may synchronize and output signals received from the MUs 120-1 to 120-n in a predetermined method. The operation of the digital signal processor 230 will be described later in connection with FIG. 3.

The D/A converter 240 may be configured to convert a signal processed by the digital signal processor 230 to an analog signal. The analog signal processor 250 may be configured to process an analog signal, and may include an amplifier. For example, the analog signal processor 250 may include an analog signal amplifier configured to amplify and output an input analog signal with a preset gain. The analog signal processor 250 may not be included in the shared RU 110 in a case that there is no need for analog processing such as amplifying a digitally processed signal.

In a case that the shared RU 110 is configured to output a digital signal, the shared RU 110 may not include the D/A converter 240 and the analog signal processor 250.

A signal synchronization operation of the digital signal processor 230 will now be described in detail in connection with FIGS. 3 to 5.

Figure 3:
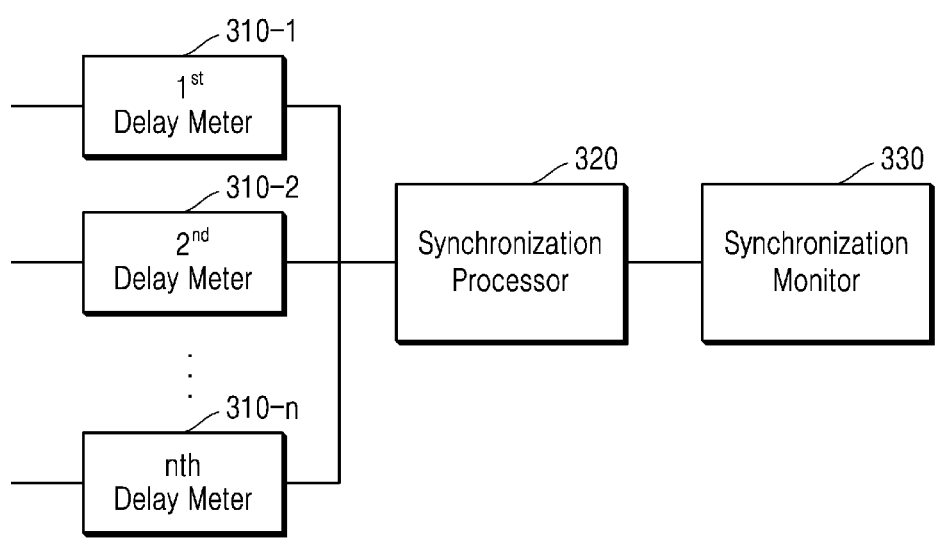
FIG. 3 is a block diagram of a digital signal processor in a shared RU, according to an embodiment of the disclosure.
Figure 4:
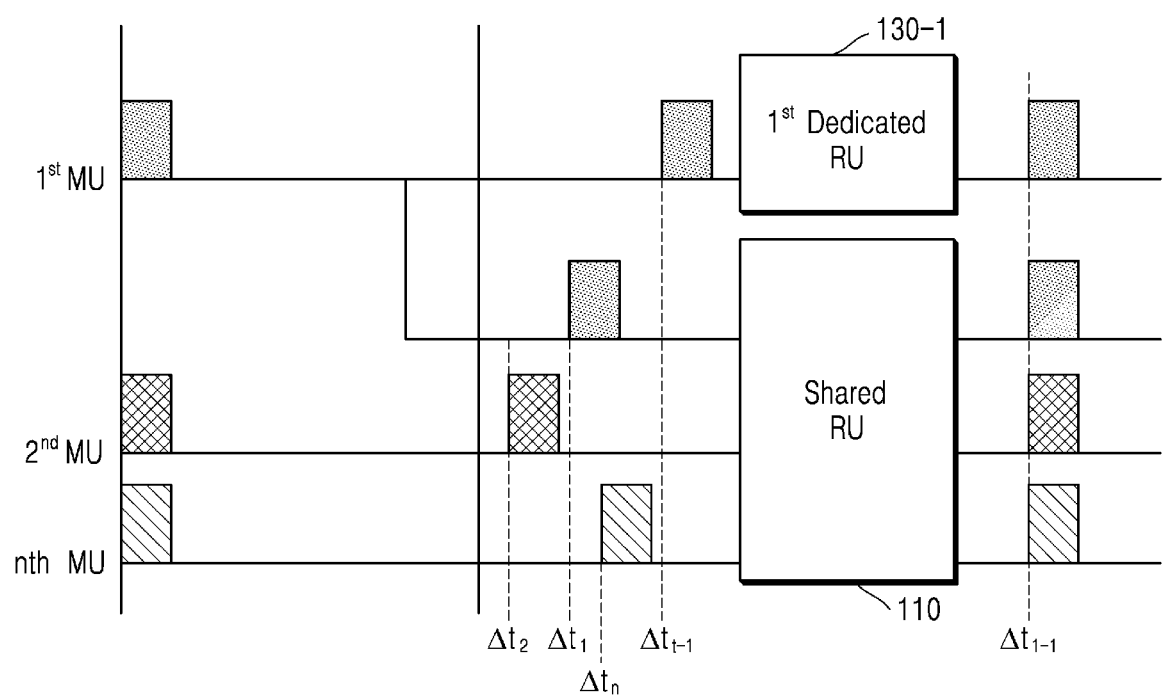
FIG. 4 illustrates a signal synchronization procedure in a mobile communication system, according to an embodiment of the present application.
Figure 5:
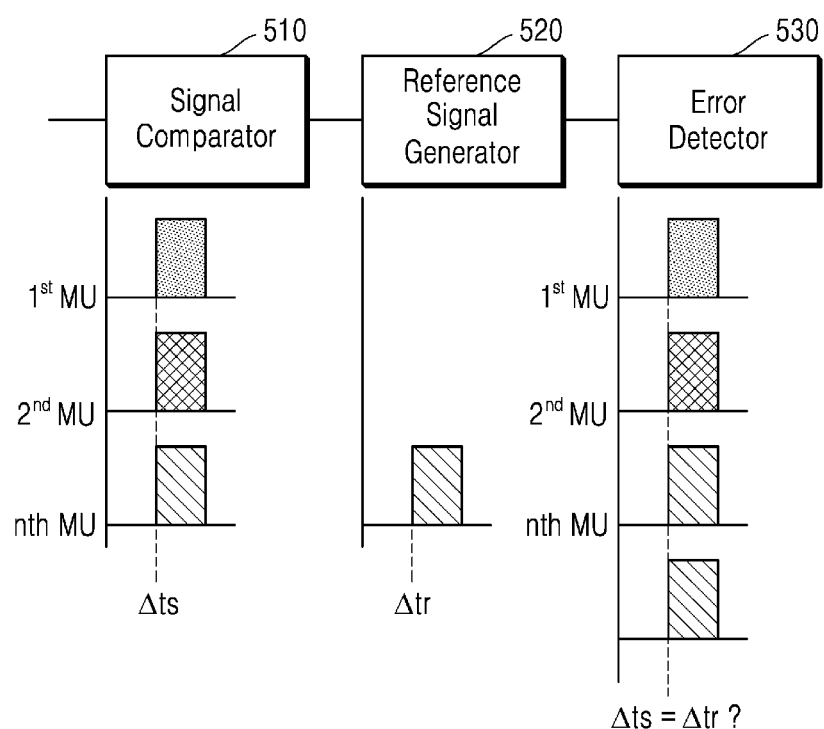
FIG. 5 illustrates a configuration of a synchronization monitor and a monitoring procedure in a shared RU, according to an embodiment of the disclosure.

FIG. 3 is a block diagram of a digital signal processor of a shared RU, according to an embodiment of the disclosure, FIG. 4 illustrates a signal synchronization procedure in a mobile communication system, according to an embodiment of the present application, and FIG. 5 illustrates a configuration of a synchronization monitor and a monitoring procedure in a shared RU, according to an embodiment of the disclosure.

Referring to FIG. 3, the digital signal processor 230 may include n delay meters 310-1 to 310-n, a synchronization processor 320, and a synchronization monitor 330.

In the following description, assume an occasion when the signal receiver 210 connected to the n MUs 120-1 to 120-n receives n test signals and the n test signals are converted to digital signals, which is in turn input to the digital signal processor 230.

The n delay meters 310-1 to 310-n may measure delays of the test signals received from then MUs 120-1 to 120-n. For example, the first delay meter 310-1 may measure a delay time of a first test signal (referred to as a first delay time) received from the first MU 120-1. Likewise, the n-th delay meter 310-n may measure a delay time of an n-th test signal (referred to as an n-th delay time) received from the n-th MU 120-n. How the delay meters 310-1 to 310-n each measure the delay time may be almost the same as a method that is already known to the public, so detailed description thereof will be omitted.

The n delay times measured by the delay meters 310-1 to 310-n may be stored in a memory (not shown) equipped therein, and the n delay times may be used for comparison to synchronize downlink signals.

In the meantime, then delay times measured by the delay meters 310-1 to 310-n may be transmitted to their respective MUs 120-1 to 120-n. The MUs 120-1 to 120-n may thus recognize how much their respective test signals are delayed when transmitted to the shared RU 110. Specifically, the first MU 120-1 may receive the first delay time and recognize a delay time of the signal between the first MU 120-1 and the shared RU 110. Furthermore, when the first MU 120-1 transmits a test signal to the shared RU 110, it may also transmit the test signal to the first dedicated RU 130-1, receive a response signal (e.g., an ACK signal) from the first dedicated RU 130-1 that has received the test signal, and recognize a delay time for the first dedicated RU 130-1. The first MU 120-1 may generate information (hereinafter, referred to as first delay information) including information about the delay time for the first dedicated RU 130-1 and/or information about a delay time for the shared RU 110. The first MU 120-1 may transmit the first delay information to the shared RU 110 and/or the first dedicated RU 130-1.

Accordingly, the shared RU 110 may also recognize a delay time between the first dedicated RU 130-1 and the first MU 120-1. The shared RU 110 may recognize and store the following information in a memory (not shown):

(1) a delay time between the first MU 120-1 and the shared RU 110, i.e., a first shared delay time (2) a delay time between the n-th MU 120-n and the shared RU 110, i.e., an n-th shared delayed time (3) a delay time between the first MU 120-1 and the first dedicated RU 130-1, i.e., a first dedicated delay time (4) a delay time between the n-th MU 120-n and the n-th dedicated RU 130-n, i.e., an n-th dedicated delayed time The synchronization processor 320 may use the plurality of shared delay times and/or the plurality of dedicated delay times to synchronize input downlink signals. For example, the synchronization processor 320 may generate delay information based on the longest of the plurality of shared delay times and the plurality of dedicated delay times.

Specifically, assume a case that the first shared delay time is 0.11 msec, the second shared delay time is 0.05 msec, the n-th shared delay time is 0.15 msec, and the first dedicated delay time is 0.20 msec. In this case, the synchronization processor 320 may generate sync times for delaying the remaining downlink times based on the first dedicated delay time, which is the longest delay time. The synchronization processor 320 may apply a delay time of 0.09 msec to a signal received from the first MU 120-1, a delay time of 0.15 msec to a signal received from the second MU 120-2, and a delay time of 0.05 msec to a signal received from the n-th MU 120-n. The synchronization processor 320 may generate a sync time corresponding to each of the MUs 120-1 to 120-n in the following equation:

*n*-th sync time=the longest delay time−the *n*-th shared delay time

The synchronization processor 320 may synchronize the downlink signal according to the generated sync time. In other words, the synchronization processor 320 may synchronize future input downlink signals by applying n sync times generated upon reception of the test signals to the future input downlink signals. The synchronization processor 320 may delay the first downlink signal (i.e., a downlink signal received from the first MU 120-1) by applying the first sync time to the first downlink signal and delay the n-th downlink signal by applying the n-th sync time to the n-th downlink signal. Accordingly, the first to n-th downlink signals may all be synchronized and then output to the outside, and synchronization may be done not only for the downlink signals input to the shared RU 110 but also with the other dedicated RUs 130-1 to 130-n. It is because the delay times for the dedicated RUs 130-1 to 130-n are also considered to create the sync information.

Referring to FIG. 4, shown is an occasion when the first downlink signal is transmitted from the first MU 120-1 to the first dedicated RU 130-1 and the shared RU 110, the second downlink signal is transmitted from the second MU 120-2 to the shared RU 110, and the n-th downlink signal is transmitted from the n-th MU 120-n to the shared RU 110. In this case, it is shown that the first shared delay time is $\Delta t1$, the first dedicated delay time is $\Delta t1$-1, the second shared delayed time is $\Delta t2$, and the n-th shared delayed time is $\Delta tn$.

The shared RU 110, especially the synchronization processor 320 may delay the respective downlink signals with respect to the n sync times generated based on the longest of the delayed times. Accordingly, synchronized signals may be output from the shared RU 110 and the first dedicated RU 130-1.

Turning back to FIG. 3, the synchronization monitor 330 may determine whether there is an error in the signal synchronized and output by the synchronization processor 320.

Referring to FIG. 5, the synchronization monitor 330 may include a signal comparator 510, a reference signal generator 520, and an error detector 530.

The signal comparator 510 may compare n downlink signals differently delayed by the synchronization processor 320 to determine whether there is a difference. For example, the signal comparator 510 may determine whether the n downlink signals are delayed the same as a reference signal is delayed. In the example of FIG. 5, the signal comparator 510 may determine whether the first to n-th downlink signals are differentially delayed but finally delayed by the same amount of time $\Delta ts$ as compared to the reference time.

The reference signal generator 520 may use a digital clock equipped therein to generate the reference signal that corresponds to a signal verified by passing the signal comparator 510. In other words, the reference signal generator 520 may generate and output the reference signal delayed by the same amount of time $\Delta tr$ as compared to a reference time.

The error detector 530 may compare the signal verified by passing the signal comparator 510 with the reference signal generated by the reference signal generator 520 to determine whether the same amount of delay is maintained, i.e., $\Delta ts=\Delta tr$. When it is determined that the same amount of delay is not maintained in both the signal and the reference signal, the error detector 530 may output an alarm sound, display an alarm screen, or transmit an alarm message to a terminal of an administrator, such as a personal computer or a mobile communication terminal.

Figure 6:
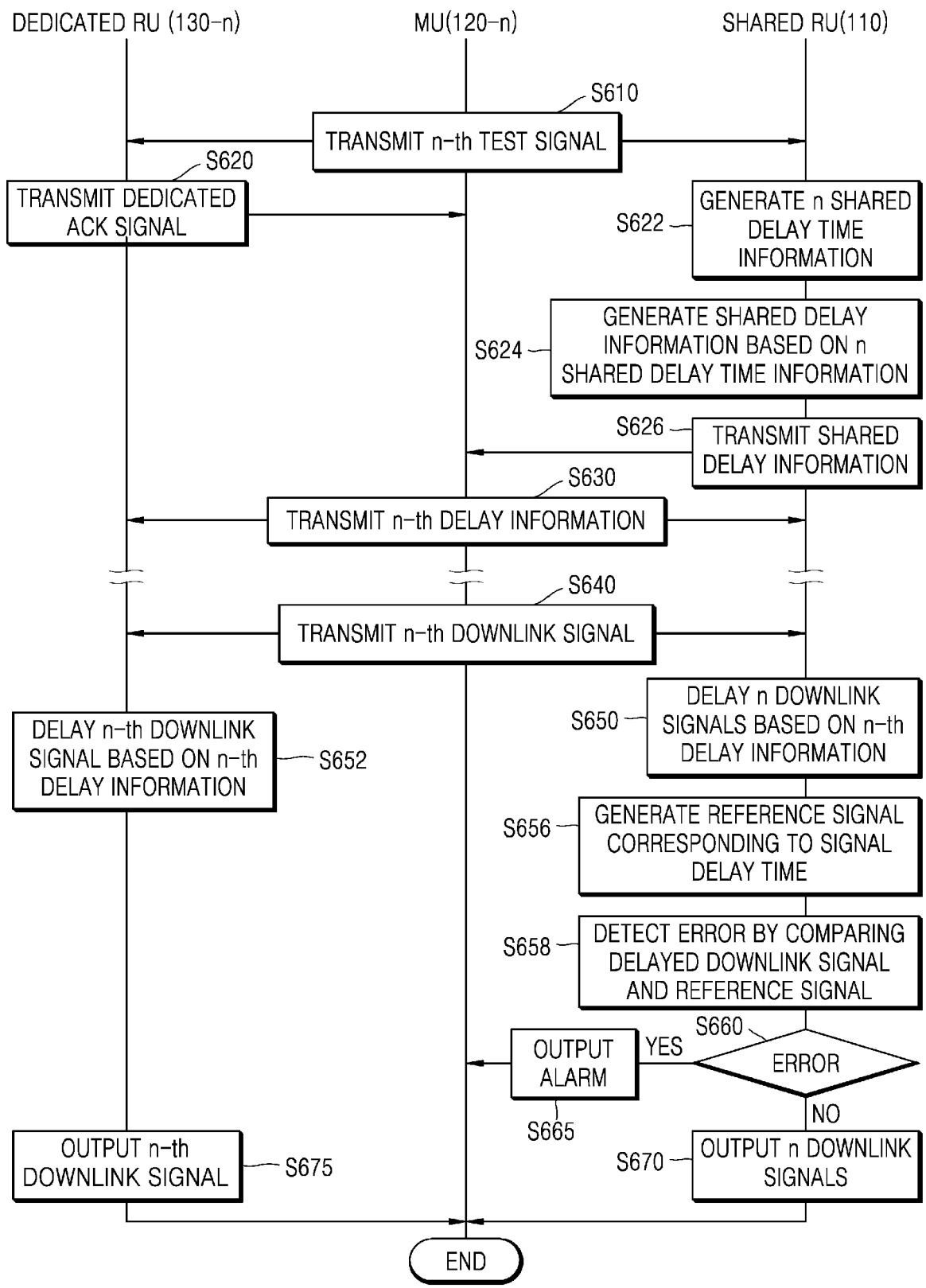
FIG. 6 is a flowchart of a signal synchronization method in a shared RU, according to an embodiment of the disclosure.

FIG. 6 is a flowchart of a signal synchronization method in a shared RU, according to an embodiment of the disclosure.

In the following description, a method of synchronizing signals in the shared RU 110 will be summarized again. Operations, as will be described below, may be performed by the components of the shared RU 110 as described above in connection with FIGS. 2 to 5, but for convenience of explanation and understanding of the disclosure, they will be described as being performed collectively by the common RU 110.

The MUs 120-1 to 120-n connected to the shared RU 110 may generate the delay information by considering delay times for the other dedicated RUs 130-1 to 130-N connected to the MUs 120-1 to 120-n, in which case the shared RU 110 receives signals from the plurality of MUs 120-1 to 120-n and are required to create delay information by considering all delay times for the plurality of MUs 120-1 to 120-n.

In the following description, for the sake of easy understanding, assume a DAS including one shared RU 110 and one dedicated RU 130-n.

First, in operation S610, the n-th MU 120-n generates and transmits the n-th test signal to the shared RU 110 and the dedicated RU 130-n.

In operation S620, the dedicated RU 130-n generates a dedicated acknowledgment signal (e.g., an ACK signal) in response to reception of the n-th test signal and transmits the dedicated acknowledgment signal to the n-th MU 120-n.

In operation S622, the shared RU 110 generates n pieces of shared delay time information in response to reception of the first to n-th test signals from the first to n-th MUs 120-1 to 120-n. Specifically, the first shared delay time information may be information about a delay time of the first test signal, and the n-th shared delay time information may be information about a delay time of the n-th test signal.

In operation S624, the shared RU 110 creates shared delay information based on the n pieces of shared delay time information. For example, the common RU 110 may create one of the n pieces of shared delay time information having the longest delay time as the shared delay information.

In operation S626, the shared RU 110 transmits the shared delay information to the n-th MU 120-n.

In operation S630, the n-th MU 120-n creates the n-th delay information based on the dedicated acknowledgment signal and the shared delay information. For example, the n-th MU 120-n may recognize a delay time for the n-th dedicated RU 130-n through the dedicated acknowledgment signal, recognize a delay time for the shared RU 110 through the shared delay information, and create the n-th delay information for synchronizing all the signals based on the longest of the delay times. Subsequently, the n-th MU 120-n may transmit the n-th delay information to the shared RU 110 and/or the N-th dedicated RU 130-n.

The shared RU 110 and/or the n-th dedicated RU 130-n may receive and store the n-th delay information. The shared RU 110 in particular may recognize information about a delay time for the n-th dedicated RU 130-*n*, i.e., the n-th dedicated delay time information, through the n-th delay information. In this way, the shared RU 110 may generate sync times corresponding to n downlink signals, respectively.

In operation S640, the n-th MU 120-*n* generates and transmits the n-th downlink signal to the n-th dedicated RU 130-*n* and the shared RU 110.

In operation S650, the shared RU 110 delays the n downlink signals based on the n-th delay information. For example, the shared RU 110 may delay the n downlink signals by their respective sync times to correspond to the n-th delay information.

In operation S652, the n-th dedicated RU 130-*n* delays the n-th downlink signal based on the n-th delay information. Specifically, the n-th dedicated RU 130-*n* may delay the n-th downlink signal by an amount of time corresponding to the n-th delay information.

In operation S656, the shared RU 110 generates a reference signal corresponding to the delay times of the n downlink signals.

In operation S658, the shared RU 110 may compare the n delayed downlink signals with the reference signal to detect errors.

When detecting an error in operation S660, the shared RU 110 outputs an alarm sound or transmits a message to an administrator's terminal in a predetermined method in operation S665.

The shared RU 110 outputs n synchronized downlink signals in operation S670, and simultaneously, the n-th dedicated RU 130-*n* also outputs the n-th downlink signal in operation S675.

Embodiments of the disclosure have thus far been described on the assumption that the mobile communication network 100 is a DAS including the MUs 120-1 to 120-*n* managed by many different operators, the dedicated RUs 130-1 to 130-*n*, and the shared RU 110. Embodiments of the disclosure are not, however, limited to the DAS.

Accordingly, embodiments of the disclosure may be applied to any types of mobile communication networks in which (1) there is a single second communication device connected to multiple first communication devices, (2) the first communication devices may be managed by different operators and may not be connected to one another, and (3) the first communication devices may be connected to one or more third communication devices.

In the meantime, when a device error occurs in one of the plurality of MUs 120-1 to 120-*n* or an error in connection with the shared RU 110 occurs, it may cause an error in delay synchronization of the MUs 120-1 to 120-*n*. In other words, unlike traditional service provision only through a dedicated RU, when a service is provided through the shared RU 110, an error occurring in an MU may lead to a new problem of causing a service failure of the other MUs.

To solve the problem, in an embodiment of the disclosure, when detecting a synchronization error, the shared RU 110 may be configured to perform a synchronization restoration operation for restoring an abnormal signal to a normal signal. The synchronization restoration operation will now be described in detail in connection with FIGS. 7 to 10.

Figure 7:
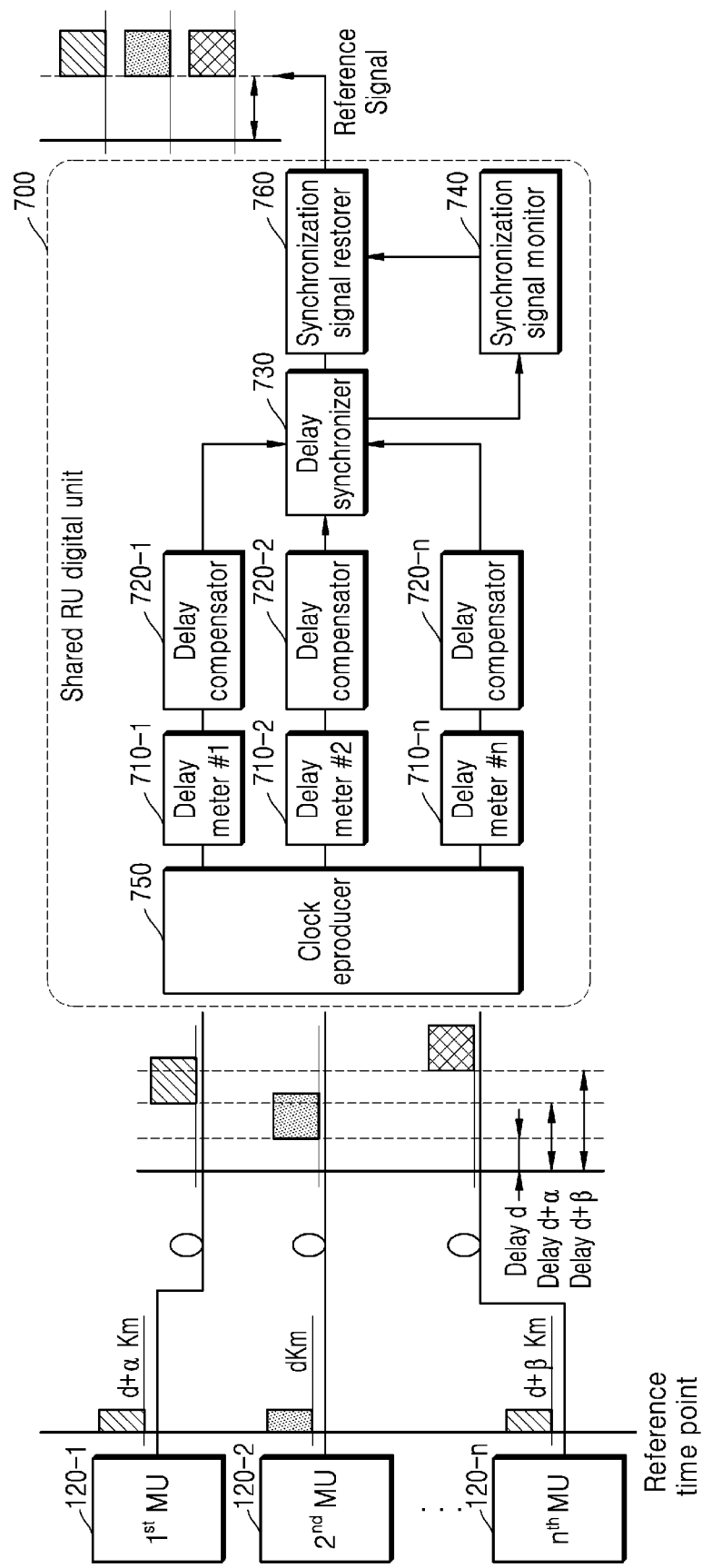
FIG. 7 is a block diagram of a digital signal processor of a shared RU, according to an embodiment of the disclosure.

FIG. 7 is a block diagram of a digital signal processor of a shared RU, according to an embodiment of the disclosure.

Referring to FIG. 7, in a digital signal processor 700, delay meters 710-1 to 710-*n* may correspond to the delay meters 310-1 to 310-*n* of FIG. 3 and a synchronization monitor 740 may correspond to the synchronization monitor 330 of FIG. 3. Furthermore, delay compensators 720-1 to 720-*n* and a delay synchronizer 730 may correspond to the synchronization processor 320 of FIG. 3. Accordingly, descriptions of the components shown in FIG. 3 may be similarly applied to the components shown in FIG. 7.

In the meantime, the delay compensators 720-1 to 720-*n* are components for compensating for an amount of delay between different RUs, and specifically, an amount of delay between RUs connected to corresponding MUs 120-1 to 120-*n*. Specifically, the first delay compensator 720-1 corresponding to the first MU 120-1 may determine a first delay time of a signal transmitted from the first MU 120-1 to the shared RU 110 and a second delay time of a signal transmitted from the first MU 120-1 to the first dedicated RU 130-1 (see FIG. 1), and measure and compensate for an amount of delay to synchronize the first delay time and the second delay time.

Based on a result of compensating the amounts of delays of the MUs 120-1 to 120-*n* by the delay compensators 720-1 to 720-*n*, the delay synchronizer 730 may synchronize the signals transmitted between the MUs 120-1 to 120-*n* and the shared RU 110 to have the same delay time.

Accordingly, synchronization between all the MUs 120-1 to 120-*n* and RUs 110 and 130-1 to 130-1, which make up the mobile communication system, may be performed. Although the embodiment of FIG. 7 illustrates that synchronization is performed by the delay synchronizer 730 after compensation made by the delay compensators 720-1 to 720-*n*, the processing order may be freely changed.

The delay synchronizer 730 may output delay-compensated signals to the synchronization signal monitor 740, which may in turn monitor whether the output signals are synchronized to determine whether there is an error. As described above in connection with FIG. 5, the synchronization signal monitor 740 may monitor whether the signals are synchronized by determining whether n signals provided from the respective MUs 120-1 to 120-*n* and synchronized are delayed by the same time as the reference signal. For example, the synchronization signal monitor 740 may monitor whether the signals are synchronized based on a sync signal (e.g., sync block) in the signal (downlink signal) received from each of the MUs 120-1 to 120-*n*.

When it is determined that at least some of the signals are not correctly synchronized, the synchronization signal monitor 740 may output an alarm sound and/or an alarm screen as described above in connection with FIG. 5 or may transmit an alarm message to the administrator's terminal (e.g., personal computer (PC) or mobile communication terminal). Furthermore, the synchronization signal monitor 740 may transmit a signal indicating that the signals are not correctly synchronized to the synchronization signal restorer 760.

In the disclosure, the digital signal processor 700 may further include the clock reproducer 750 and the synchronization signal restorer 760.

The clock reproducer 750 may enable the use of a sync signal restored through sharing of different clocks sent from the different MUs 120-1 to 120-*n*. The clock reproducer 750 will be described in more detail in connection with FIG. 8.

On receiving the signal indicating an incorrect synchronization state from the synchronization signal monitor 740, the synchronization signal restorer 760 may restore synchronization of signals by using a normal signal to restore an abnormal signal. The operation of restoring synchronization of the synchronization signal restorer 760 will be described later in more detail in connection with FIG. 9.

Figure 8:
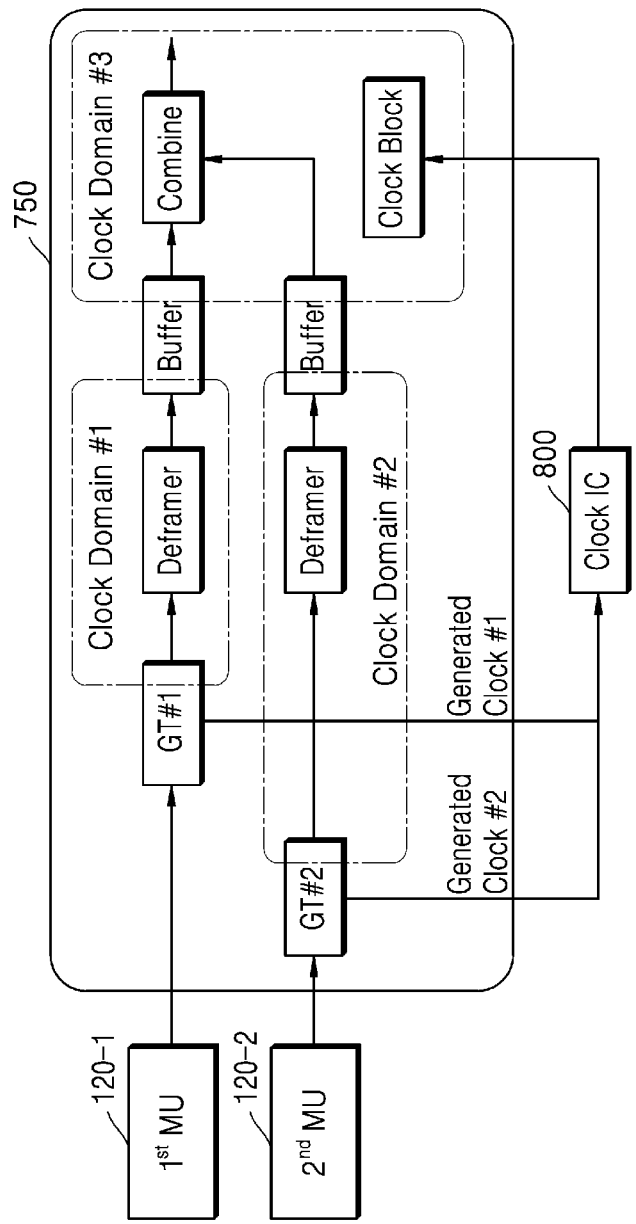
FIG. 8 is a block diagram illustrating an implementation of a clock reproducer shown in FIG. 7.

FIG. 8 is a block diagram illustrating an implementation of the clock reproducer shown in FIG. 7.

Referring to FIG. 8, the clock reproducer 750 may process different clock domain signals input from the plurality of MUs 120-1 and 120-2 based on a shared clock domain.

Specifically, the clock reproducer 750 may provide clocks input from the plurality of MUs 120-1 and 120-2 to a clock integrated circuit (IC) 800 of the shared RU 110. In an embodiment of the disclosure, the clock reproducer 750 may generate clocks of the respective MUs 120-1 and 120-2 based on signals (e.g., test signals) input from the MUs 120-1 and 120-2, and provide the generated clocks to the clock IC 800 of the shared RU 110. Although only two MUs 120-1 and 120-1 are shown in FIG. 8 for convenience of explanation, the clock reproducer 750 may provide clocks input from all MUs that constitute the mobile communication system to the clock IC 800. The signals input from the respective MUs 120-1 and 120-2 may form different clock domains. The signals may be stored in a buffer to be combined later based on a single clock.

The clock IC 800 may set one of the clocks provided from the clock reproducer 750 as a reference clock. For example, the clock IC 800 may set one of the clocks of the MUs 120-1 and 120-2 as the reference clock based on LoS of the input signals from the MUs 120-1 and 120-2.

An extra clock domain may be formed by the reference clock set by the clock IC 800, and the clock reproducer 750 may combine the signals of the MUs 120-1 and 120-2 received through the buffer based on the extra clock domain into a single clock (the reference clock) for operation. In other words, the clocks of signals from the MUs 120-1 and 120-2 are processed and operated to correspond to the shared reference clock, so when an error occurs in delay synchronization of a signal from a certain MU, a signal (normal signal) from another MU may be reproduced to restore the synchronization.

Figure 9:
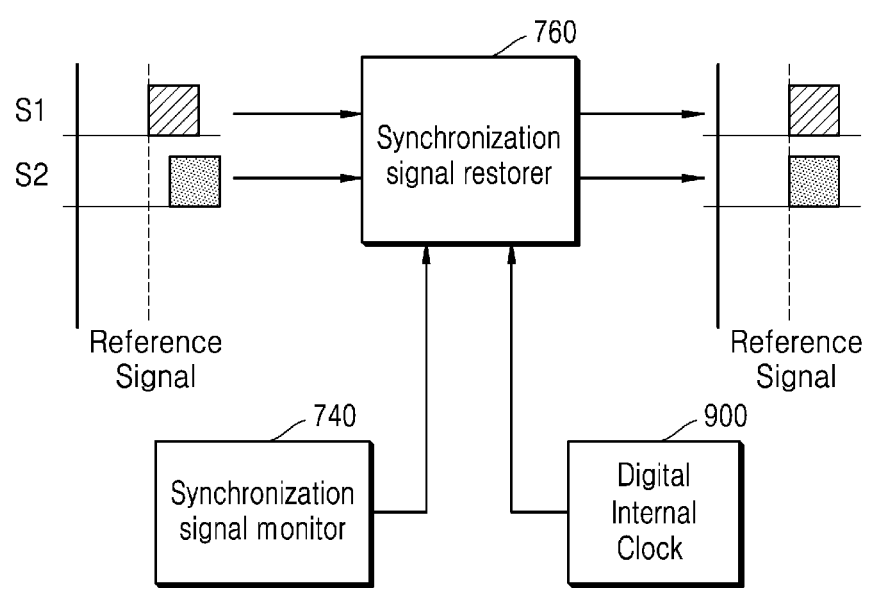
FIG. 9 is a diagram for describing an operation of a synchronization signal restorer shown in FIG. 7 restoring an abnormal signal to a normal signal when an error in synchronization is detected.

FIG. 9 is a diagram for describing an operation of a synchronization signal restorer shown in FIG. 7 restoring an abnormal signal to a normal signal when an error in synchronization is detected.

Referring to FIG. 9, the synchronization signal restorer 760 may receive downlink signals S1 and S2, which are subjected to delay synchronization through the delay meters 710-1 to 710-n, the delay compensators 720-1 to 720-n, and the delay synchronizer 730. For example, the first downlink signal S1 may be a signal transmitted from the first MU 120-1, and the second downlink signal S2 may be a signal transmitted from the second MU 120-2. Although there are two downlink signals S1 and S2 shown in FIG. 9 as being input to the synchronization signal restorer 760, the number of downlink signals may correspond to the number of MUs 120-1 to 120-n.

The synchronization signal monitor 740 may monitor whether the downlink signals S1 and S2 are correctly synchronized. For example, the synchronization signal monitor 740 may monitor whether the downlink signals S1 and S2 are correctly synchronized by checking whether the downlink signals S1 and S2 are delayed by the same time as the reference signal.

When it is determined that the downlink signals S1 and S2 are correctly synchronized, the shared RU 110 may process the downlink signals S1 and S2 (e.g., perform analog conversion) and output the processing result. On the other hand, when there is a synchronization error for one, e.g., S2 of the signals S1 and S2 (e.g., when the signal S2 is not delayed as much as the reference signal), the synchronization signal restorer 760 may reproduce the normal signal S1 to restore the abnormal signal S2, thereby keeping the signals synchronized. In other words, the second downlink signal S2 transmitted from the second MU 120-2 and subjected to delay synchronization is replaced by the first downlink signal S1 corresponding to a normal signal, so that all the signals may be synchronized.

In an embodiment of the disclosure, the synchronization signal restorer 760 may detect the number of intervals in which there is a change per certain time range (e.g., 20 ms) for each of the signal input to the synchronization signal restorer 760 and the restored signal, and determine whether an abnormal signal is normally restored by checking whether the detected numbers correspond to each other. When it is determined that normal restoration is made, the synchronization signal restorer 760 may output the input normal signal S1 and the restored signal. In an embodiment, when a synchronization error occurs, the synchronization signal restorer 760 may output an alarm sound, display an alarm screen, or transmit an alarm message to the administrator's terminal (e.g., a PC or a mobile communication terminal).

For 5G services, domestic operators have been consistently investing a lot of money to build and operate 5G RU equipment. For in-building and subway in particular, RUs of the respective operators are installed and operated in the same station, making it inefficient in terms of expenses of installation and operation. According to embodiments of the disclosure, the installation and operation efficiency may be maximized by providing 5G shared RU connected to the various operators. Furthermore, even when a synchronization error occurs for an MU of one operator connected to the shared RU, it may be resolved by signal reproduction of another MU, thereby securing network reliability.

Figure 10:
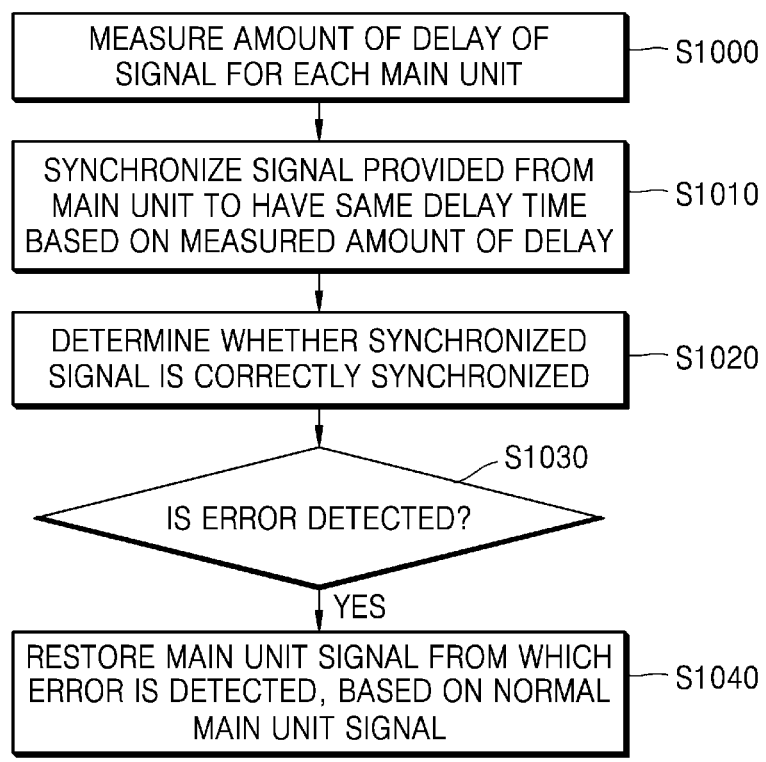
FIG. 10 is a flowchart of method of restoring synchronization in a shared RU, according to an embodiment of the disclosure.

FIG. 10 is a flowchart of a method of restoring synchronization in a shared RU, according to an embodiment of the disclosure.

Referring to FIG. 10, the shared RU 110 receives signals (test signals) from the MUs 120-1 to 120-n connected to the shared RU 110 and measures an amount of delay for each of the received signals, in S1000.

The shared RU 110 performs delay synchronization for downlink signals received from the MUs 120-1 to 120-n by controlling the downlink signals to have the same delay time (same amount of delay) based on the measured amounts of delay, in S1010. For example, the shared RU 110 may perform delay synchronization on the signals based on the longest of the delay times of the received downlink signals.

The shared RU 110 determines whether the delay-synchronized downlink signals are normally synchronized, i.e., whether the downlink signals are delayed by the same time, in S1020. When it is determined that there is an error in the delay synchronization in S1030, the shared RU 110 restores a downlink signal of a main unit detected as having the error by using (reproducing) a downlink signal of a normally synchronized main unit, in S1040.

According to the disclosure, a communication repeater and method for restoring a synchronization signal may maximize reliability through the communication repeater when different operators provide services, thereby enabling efficient establishment and operation of equipment for providing the services.

Effects attainable by embodiments according to technical ideas of the disclosure are not limited to what are described above, and throughout the specification, it will be clearly appreciated by those of ordinary skill in the art that there may be other effects unmentioned.

While the disclosure has been shown and described with reference to certain exemplary embodiments thereof, it will be understood by those of ordinary skill in the art that various changes in form and details may be made therein without departing from the spirit and scope of the disclosure as defined by the appended claims and their equivalents.

What is claimed is:

1. A shared radio unit (RU) comprising:
 a receiver configured to receive a plurality of test signals from a plurality of external communication devices and then receive a plurality of downlink signals from the plurality of external communication devices;
 a digital signal processor configured to measure a delay time of each of the plurality of test signals, generate a reference signal based on the measured delay times of the plurality of test signals, and perform a delay synchronization process for the plurality of downlink signals based on the reference signal; and
 a transmitter configured to transmit the delay synchronized plurality of downlink signals,
 wherein the digital signal processor is configured to:
  determine whether the delay synchronized plurality of downlink signals have a synchronization error being not synchronized the same as the reference signal, and
  perform synchronization restoration for a downlink signal having the synchronization error among the delay synchronized plurality of downlink signals to be synchronized the same as the reference signal, based on a result of the determining.

2. The shared RU of claim 1, wherein the digital signal processor is configured to, when there is the downlink signal having the synchronization error, perform synchronization restoration for the downlink signal having the synchronization error based on other downlink signal correctly synchronized.

3. The shared RU of claim 2, wherein the digital signal processor is further configured to reproduce the other downlink signal correctly synchronized, and replace the downlink signal having the synchronization error with the reproduced downlink signal.

4. The shared RU of claim 1, wherein the digital signal processor is configured to obtain a clock for each of the received plurality of test signals, and set one of the obtained plurality of clocks as a reference clock, and process a clock for each of the received plurality of downlink signals to correspond to the reference clock.

5. The shared RU of claim 1, wherein the digital signal processor is configured to perform a delay synchronization process on the plurality of downlink signals based on the longest of the delay time of each of the plurality of test signals.

6. A method of restoring synchronization of a shared radio unit (RU), the method comprising:
 measuring a delay time of each of a plurality of test signals received from a plurality of external communication devices;
 generating a reference signal based on the measured delay times of the plurality of test signals;
 performing a delay synchronization process for a plurality of downlink signals received from the plurality of external communication devices based on the reference signal;
 determining whether the delay synchronized plurality of downlink signals have a synchronization error being not synchronized the same as the reference signal; and
 performing synchronization restoration for a downlink signal determined to have a synchronization error among the delay synchronized plurality of downlink signals to be synchronized the same as the reference signal based on a result of the determining.

7. The method of claim 6, wherein the performing of the synchronization restoration comprises performing synchronization restoration for the downlink signal having the synchronization error based on other downlink signal determined to be correctly synchronized among the plurality of downlink signals.

8. The method of claim 7, wherein the performing of the synchronization restoration comprises
 reproducing the other downlink signal determined to be correctly synchronized; and
 replacing the downlink signal having the synchronization error with the reproduced downlink signal.

9. The method of claim 6, further comprising:
 obtaining a clock for each of the received plurality of test signals, and set one of the obtained plurality of clocks as a reference clock; and
 processing a clock for each of the received plurality of downlink signals to correspond to the reference clock.

10. The method of claim 6, wherein the performing of the delay synchronization process comprises performing a delay synchronization process on the plurality of downlink signals based on the longest of the delay time of each of the plurality of test signals.

* * * * *